US008538086B2

(12) United States Patent
Yamakawa

(10) Patent No.: US 8,538,086 B2
(45) Date of Patent: Sep. 17, 2013

(54) IMAGE INSPECTION APPARATUS, IMAGE INSPECTION METHOD, AND COMPUTER PROGRAM PRODUCT

(75) Inventor: Shinji Yamakawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 347 days.

(21) Appl. No.: 12/805,984

(22) Filed: Aug. 27, 2010

(65) Prior Publication Data
US 2011/0052078 A1    Mar. 3, 2011

(30) Foreign Application Priority Data

Aug. 28, 2009  (JP) ................................ 2009-198086

(51) Int. Cl.
*G06K 9/00* (2006.01)
(52) U.S. Cl.
USPC ........... 382/112; 382/175; 382/176; 382/177; 382/218; 358/530; 358/504; 358/518; 358/519
(58) Field of Classification Search
USPC ......... 382/199, 266, 218, 261, 112, 175–180; 358/530, 504, 518, 519
See application file for complete search history.

(56) References Cited

U.S. PATENT DOCUMENTS

| 5,444,518 | A | 8/1995 | Hashiguchi et al. |
| 5,862,434 | A | 1/1999 | Yamakawa |
| 2004/0057629 | A1* | 3/2004 | Shikami et al. ............... 382/254 |

FOREIGN PATENT DOCUMENTS

| JP | 07-186375 | 7/1995 |
| JP | 09-131951 | 5/1997 |
| JP | 09-264856 | 10/1997 |
| JP | 10-048149 | 2/1998 |
| JP | 11-142350 | 5/1999 |
| JP | 03-204876 | 6/2001 |
| JP | 2002-048723 | 2/2002 |
| JP | 2003-259115 | 9/2003 |
| JP | 2003-266646 | 9/2003 |
| JP | 03-523994 | 2/2004 |
| JP | 2005-205852 | 8/2005 |
| JP | 03-788696 | 4/2006 |

OTHER PUBLICATIONS

Abstract of JP 09-015168 published Jan. 17, 1997.
Abstract of JP 11-142350 published May 28, 1999.
Abstract of JP 2000-127353 published May 9, 2000.
Office Action dated Jun. 5, 2013 for corresponding Japanese patent application No. 2009-198086.

* cited by examiner

*Primary Examiner* — Kim Vu
*Assistant Examiner* — Ruiping Li
(74) *Attorney, Agent, or Firm* — Harness, Dickey & Pierce, P.L.C.

(57) ABSTRACT

An image inspection apparatus that compares a reference image with an inspection image obtained by scanning a printed medium on which the reference image has been printed, to determine whether the printed medium is acceptable is provided. The image inspection apparatus includes a first inspecting unit that compares the reference image exclusive of an edge in the reference image with the inspection image exclusive of an edge in the inspection image to perform inspection; a line-image detecting unit that detects a line image that contains the edge from each of the reference image and the inspection image; a second inspecting unit that compares the line image detected from the reference image with the line image detected from the inspection image to perform inspection; and a determining unit that determines whether the printed medium is acceptable based on results of these inspections.

9 Claims, 6 Drawing Sheets

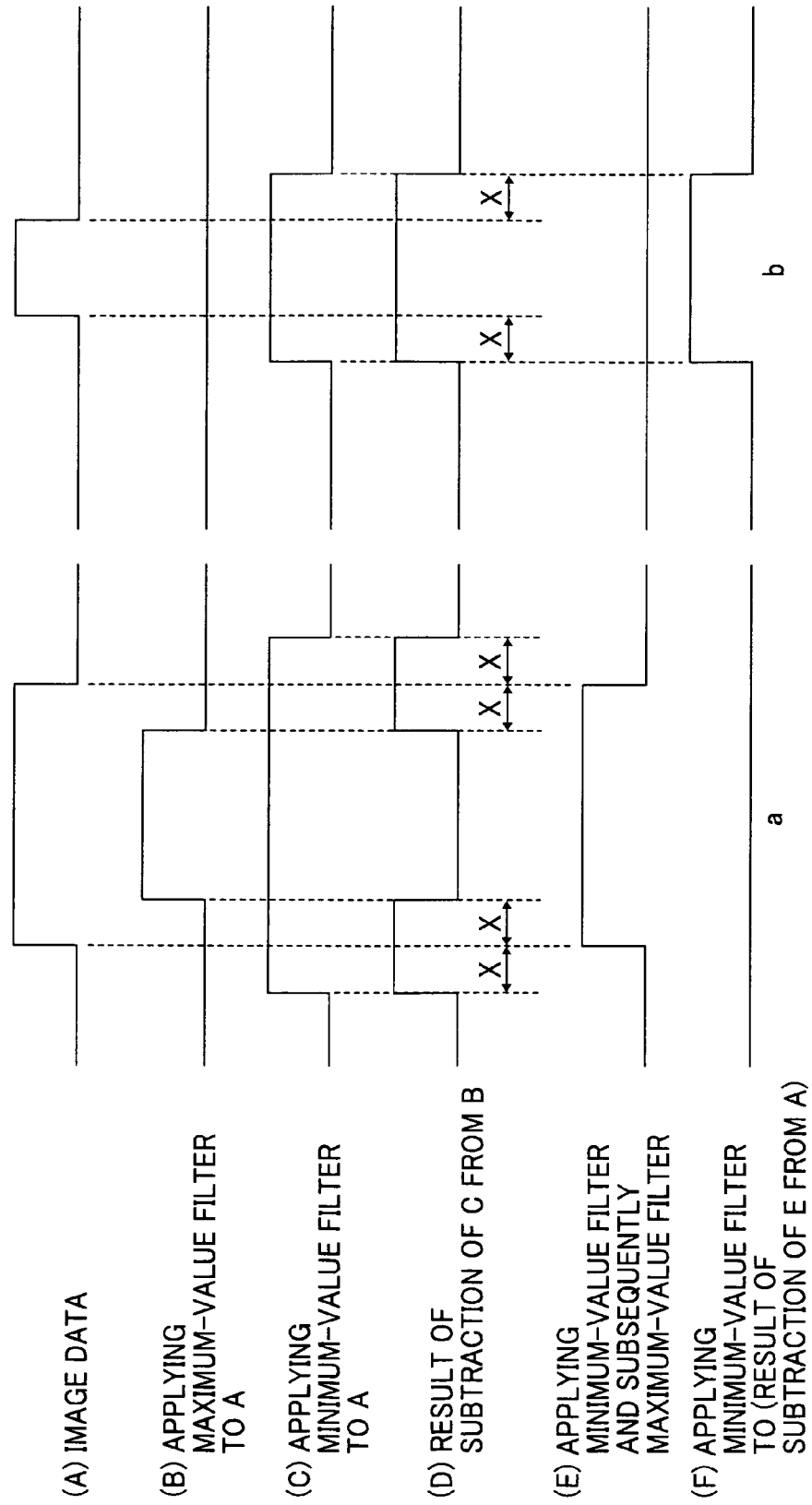

IMAGE INSPECTION APPARATUS, IMAGE INSPECTION METHOD, AND COMPUTER PROGRAM PRODUCT

CROSS-REFERENCE TO RELATED APPLICATIONS

The present application claims priority to and incorporates by reference the entire contents of Japanese Patent Application No. 2009-198086 filed in Japan on Aug. 28, 2009.

BACKGROUND OF THE INVENTION

1. Field of the Invention

The present invention is related generally to image inspection apparatus, image inspection method, and computer program product.

2. Description of the Related Art

Various apparatuses that inspect whether an image has been printed at a desired position in a desired density have been proposed. For instance, Japanese Patent No. 3523994 discloses an inspection apparatus for inspecting printed patterns formed by repeatedly printing a same single pattern. The inspection apparatus assumes an area where image density varies due to wobbling and/or undulation of a printed medium as a dead zone so as not to take the difference between a reference image and an inspection subject image (hereinafter, "inspection image") in the dead zone into account. Hence, the inspection apparatus does not detect a deficiency in the dead zone but detects only a deficiency out of the dead zone. An apparatus that monitors fluctuation in color tones on a printout by evaluating integration of a predetermined area of a reference image and that of a comparative image is disclosed in Japanese Patent Application Laid-open No. 2003-266646.

The inspection apparatus disclosed in Japanese Patent No. 3523994 adopts a technique of excluding an area at and near an edge of an image to be inspected so as to take misalignment between the reference image and the inspection image (scanned image) into consideration; however, this technique is disadvantageous in not being capable of accurately inspecting an image (e.g., a line image) that includes only an edge such as a thin line (boundary). Particularly, inspection according to the technique disclosed in Japanese Patent No. 3523994 is not appropriate for a type of misalignment between the reference image and the inspection image that has occurred while a printed medium (paper) is scanned by a scanner. The technique disclosed in Japanese Patent Application Laid-open No. 2003-266646 has no problem when performing comprehensive density inspection because comparison is performed based on integrals of the predetermined area; however, the technique is disadvantageously inappropriate for performing local inspection.

SUMMARY OF THE INVENTION

It is an object of the present invention to at least partially solve the problems in the conventional technology.

According to an aspect of the present invention, there is provided an image inspection apparatus that performs comparison between a reference image and an inspection image obtained by performing scan of a printed medium on which the reference image has been printed, to determine whether the printed medium is acceptable, the image inspection apparatus including: a first inspecting unit that compares the reference image exclusive of an edge in the reference image with the inspection image exclusive of an edge in the inspection image to perform inspection; a line-image detecting unit that detects a line image inclusive of the edge in the reference image from the reference image, and a line image inclusive of the edge in the inspection image from the inspection image; a second inspecting unit that compares the line image detected from the reference image with the line image extracted from the inspection image to perform inspection; and a determining unit that determines whether the printed medium is acceptable based on a result of the inspection performed by the first inspecting unit and a result of the inspection performed by the second inspecting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram illustrating processing performed by a boundary recognition unit and a line detecting unit.

DETAILED DESCRIPTION OF THE PREFERRED EMBODIMENT(S)

Exemplary embodiment of the present invention is described in detail below with reference to the accompanying drawings.

Figure 1:
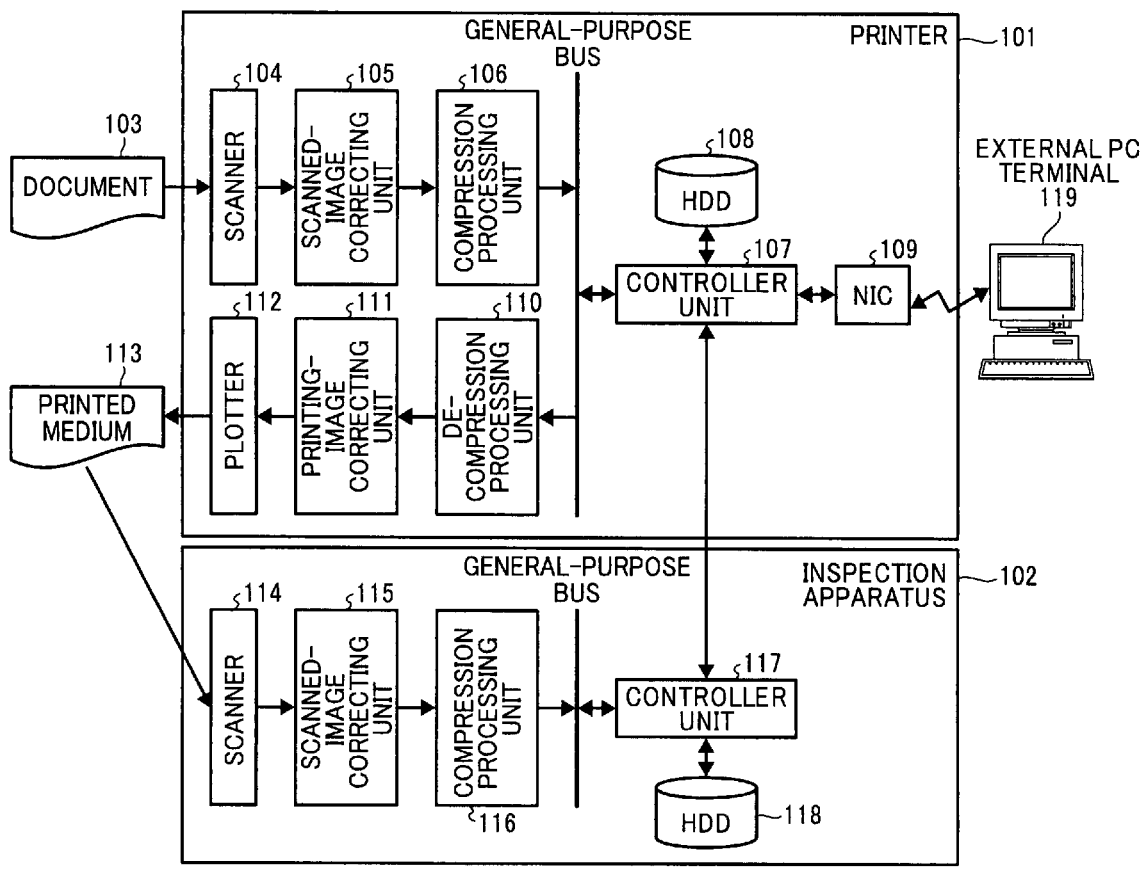
FIG. 1 illustrates a configuration of an image inspection apparatus according to an embodiment of the present invention.

FIG. 1 illustrates the configuration of an image inspection apparatus according to an embodiment of the present invention. The image inspection apparatus includes a printer 101 that prints image data and an inspection apparatus 102 that inspects a printed medium (paper), on which the image data has been printed by the printer 101.

An operation of the printer 101 will be described below. When the printer 101 is operated as a copier, a scanner 104 scans a document 103 to obtain image data, converts the obtained image data (analog signals) into digital data (600 dots per inch (dpi)), and outputs the digital data. A scanned-image correcting unit 105 performs image processing, which will be described later, on the image data (digital data) obtained by the scanner 104. Examples of the image processing include dividing image areas into a character area, a line-image area, a photo area, and the like and erasing background noise from the scanned document image. A compression processing unit 106 compresses the image data that has undergone the processing performed by the scanned-image correcting unit 105 and that is image data represented as cyan (C), magenta (M), yellow (Y), and black (Bk) components, to each of which 8 bits are allocated, and outputs the image data to a general-purpose bus. The compressed image data is transmitted to a controller unit 107 via the general-purpose bus.

The controller unit 107 that includes a semiconductor memory (not shown) receives and stores the image data. The controller unit 107 calculates coordinates necessary for image inspection and transmits information about the coordinates and the image data to a controller unit 117 of the inspection apparatus.

In this example, the image data is compressed; however, if a bandwidth of the general-purpose bus is sufficiently wide and the capacity of a hard disk drive (HDD) 108, in which the image data is to be stored, is sufficiently large, the process of compressing the image data can be omitted.

The controller unit 107 transmits the image data stored in the HDD 108 to a decompression processing unit 110 via the general-purpose bus. The decompression processing unit 110 decompresses the compressed image data into the original image data, or specifically the image data represented as CMYK color components with 8 bits per component, and transmits the decompressed image data to a printing-image correcting unit 111. The printing-image correcting unit 111 performs gamma correction, halftone processing, and the like as contrast adjustment and half-tone processing related to a plotter 112. More specifically, as the half-tone processing, error diffusion and/or dithering is performed by converting the 8-bits-per-color-component image data into 2-bit image data. The plotter 112 is a unit that performs printing via a transfer sheet by using a writing process with laser beams; more specifically, the plotter 112 forms a latent image on a photosensitive member according to the 2-bit image data, develops the latent image into a toner image, and transfers the toner image onto the transfer sheet, thereby producing a hard copy output.

When the printer 101 is operated as a distribution scanner to distribute image data to a personal computer (PC) via a network, image data is transmitted to the controller unit 107 via the general-purpose bus. The image data is subjected to color conversion, format conversion, and the like performed by the controller unit 107. The controller unit 107 performs, as the half-tone processing, gray-scale transformation according to settings defined for the distribution scanner mode. The controller unit 107 performs, as the format conversion, format conversion into a common format, such as joint photographic experts group (JPEG) or tag image file format (TIFF). Thereafter, the image data is transmitted to an external PC terminal 119 via a network interface controller (NIC) 109.

When the printer 101 is operated as a network printer to produce a printout of data output from the PC via the network, the printer 101 receives the data via the NIC 109 from the PC, parses an image and commands (described in page description language (PDL)) that decribe a print instruction contained in the data. The printer 101 renders the image into bitmap that is printable as image data, compresses the bitmap data, and stores the compressed image data. The stored image data is written to the large-capacity HDD 108 as required. The controller unit 107 calculates coordinates necessary for image inspection and transmits information about the coordinates, metadata, the image data, and the like to the controller unit 117 of the inspection apparatus.

The controller unit 107 transmits the image data stored in the HDD 108 to the decompression processing unit 110 via the general-purpose bus. The decompression processing unit 110 receives the image data which has been compressed, decompresses the image data into the original 8-bits-per-color-component image data, and transmits the decompressed image data to the printing-image correcting unit 111. The printing-image correcting unit 111 performs gamma correction, halftone processing, and the like on each of the CMYBk components on a color-component-by-color-component basis as contrast adjustment and tone conversion related to the plotter 112. More specifically, as the half-tone processing, error diffusion and/or dithering is performed by converting the 8-bits-per-color-component image data into 2-bit image data. The plotter 112 is the unit that performs printing via a transfer sheet by using the writing process with laser beams; more specifically, the plotter 112 forms a latent image on a photosensitive member according to the 2-bit image data, develops the latent image into a toner image, and transfers the toner image onto the transfer sheet, thereby producing a hard copy output.

As for processing in the printer 101, the scanner 104 scans the document 103 to obtain image data, converts the obtained image data into digital data as well as separates image areas in the document image into image areas of different area types (i.e., performs image-area separation). Various image processing is performed on the image data based on a determination result as to which one of the image area types each target pixel belongs to. This leads to considerable enhancement in image quality of an output image.

Figure 2:
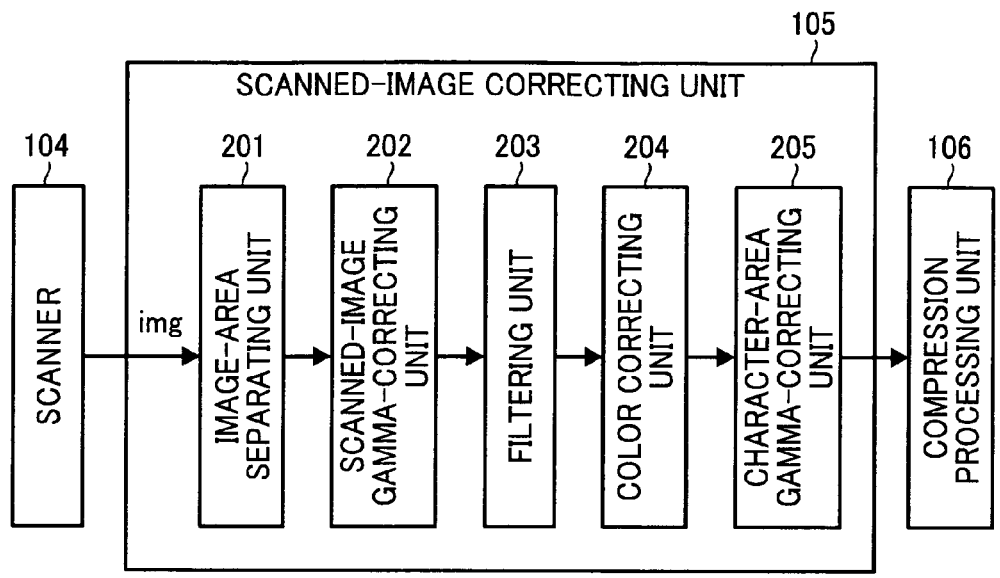
FIG. 2 depicts a configuration of a scanned-image correcting unit of a printer.

The scanned-image correcting unit 105 will be described with reference to FIG. 2. An image-area separating unit 201 in the scanned-image correcting unit 105 performs image-area separation based on image data img (of linear reflectance) fed from the scanner 104. In the present embodiment, the image-area separating unit 201 divides the image data img into three areas, or specifically an edge-of-black-character area, an edge-of-color-character area, and other area (photo areas), by using a known image-area separating method (see, for instance, Japanese Patent Application Laid-open No. 2003-259115). A corresponding one of image-area separation signals (an edge-of-black-character area signal, an edge-of-color-character area signal, and a photo area signal) is assigned to each pixel. A scanned-image gamma-correcting unit 202 converts the image data linear to the reflectance into image data linear to image density.

A filtering unit 203 switches from one filtering scheme to another filtering scheme according to the image-area separation signal. More specifically, the filtering unit 203 performs sharpness enhancement on a character area (the edge-of-black character area and the edge-of-color character area) where readability is important. In contrast, on the photo area, the filtering unit 203 performs smoothing and sharpness enhancement based on an amount of edge, which is recognized from a high contrast in density in the image data. The reason for enhancing sharpness of a sharp edge is to facilitate recognition of a character in a picture. A color correcting unit 204 converts RGB image data into CMY image data for areas other than the edge-of-black-character area by using a linear masking method or the like. The color correcting unit 204 generates Bk data by performing under color removal (UCR) on an area where C, M, and Y data portions overlap, thereby improving color reproduction of the image data, and outputs the thus-produced CMYBk data. If the edge-of-black-character area is colored with color other than black due to RGB color misregistration that has occurred during scan performed by the scanner, or CMYK color misregistration that has occurred during printing performed by the plotter, readability is undesirably lowered. To this end, the color correcting unit 204 causes only the black-character area to be represented as single-color of Bk, data that corresponds to brightness signals. A character-area gamma-correcting unit 205 adjusts the gamma of each of color-character areas and black-character area to enhance contrast between the character areas and other areas.

Figure 3:
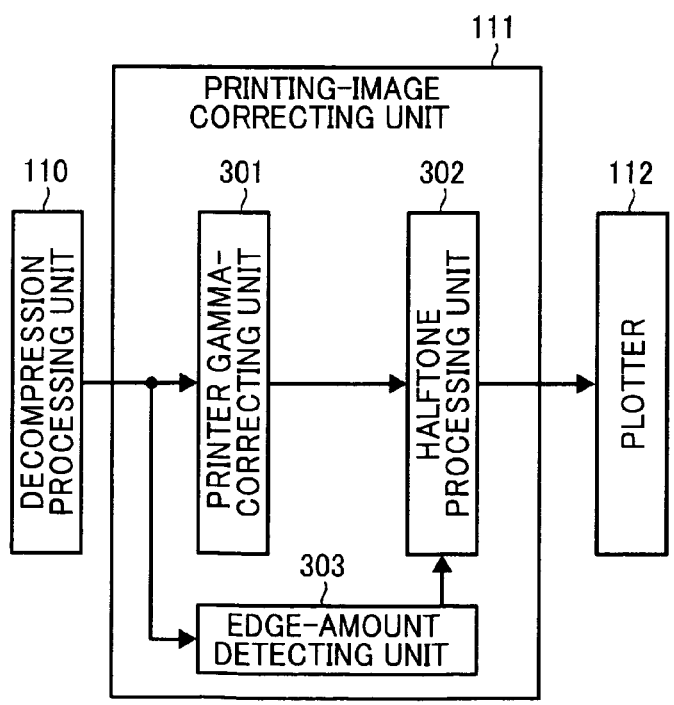
FIG. 3 depicts a configuration of a printing-image correcting unit of the printer.

As illustrated in FIG. 3, the printing-image correcting unit 111 includes a printer gamma correcting unit 301 that performs gamma correction on the image data that has undergone processing performed by the compression processing unit 106 and the decompression processing unit 110, a halftone processing unit 302 that performs quantization such as dithering and error diffusion, and tone correction, and an edge-amount detecting unit 303 that detects a high contrast in density in the image data as an amount of edge.

The printer gamma correcting unit 301 performs gamma correction according to frequency characteristics of the plotter 112. The halftone processing unit 302 performs quantization, such as dithering, according to tone characteristics of the plotter 112 and the amount of edge. Black characters can be extracted during the quantization so that contrast between the black characters and other areas is enhanced. This leads to improvement in readability of the characters.

Figure 4:
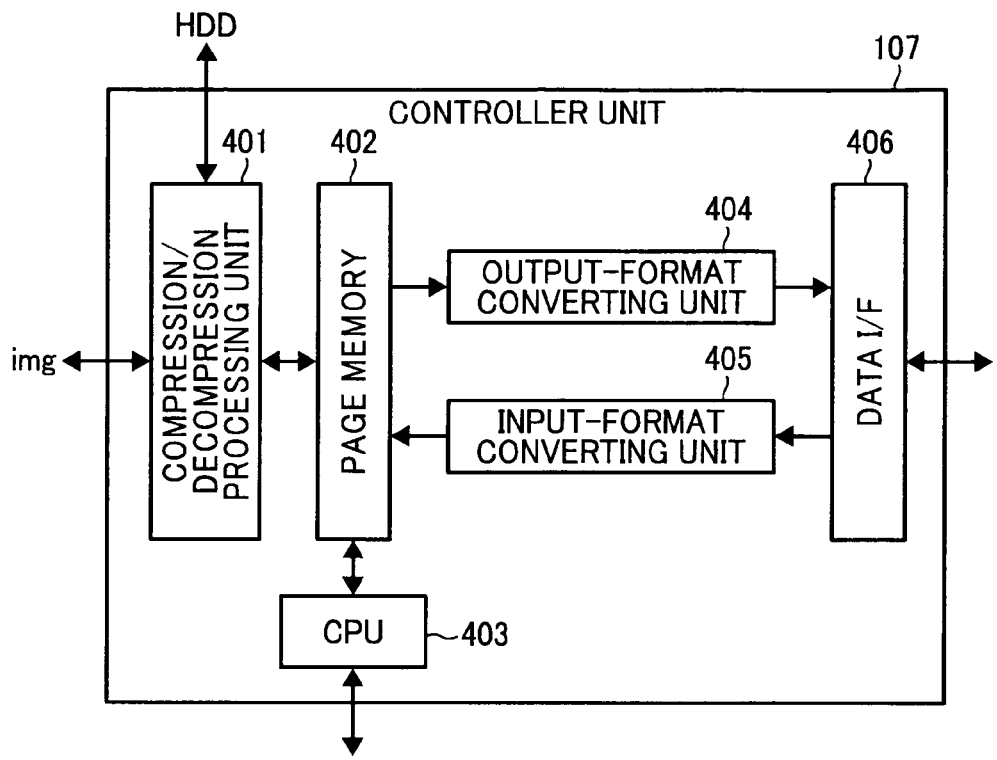
FIG. 4 depicts a configuration of a controller unit of the printer.

As illustrated in FIG. 4, the controller unit 107 includes a compression/decompression processing unit 401, a page memory 402, a central processing unit (CPU) 403, an output-format converting unit 404, an input-format converting unit 405, and a data interface (I/F) 406.

A process procedure for outputting image data to an external device is described below. Compressed data is fed from the HDD or via the general-purpose bus to the compression/decompression processing unit 401. The compressed data is decompressed by a decompression processing unit of the compression/decompression processing unit 401 into the original 8-bits-per-color-component image data, is written to the page memory 402, and then output to the output-format converting unit 404. The output-format converting unit 404 receives the image data, and performs color space conversion from CMYBk into RGB and simultaneously performs data format conversion into a common image format, such as JPEG or TIFF. The data I/F 406 receives the converted image data from the output-format converting unit 404 and outputs the image data to the NIC.

A process procedure for outputting image data fed from an external device to the plotter is described below. An instruction command fed from the external device is parsed by the CPU 403 and written to the page memory 402. The input-format converting unit 405 receives the image data from the data I/F 406 and renders the image data into CMYBk bitmap data. The bitmap data is compressed by the compression/decompression processing unit 401 and written to the page memory 402.

Meanwhile, image data to be input to the page memory 402 is image data of JPEG or TIFF format. The CMYBk image written to the page memory 402 is output to the general-purpose bus so that a printed medium 113 is produced as described above.

The inspection apparatus 102 will be described below. The inspection apparatus 102 inspects the printed medium 113 output from the printer 101. A scanner 114 scans the printed medium 113 to obtain image data, converts the obtained image data (analog signals) into digital data, and outputs the digital data. The scanned-image correcting unit 115 performs image processing, such as filtering which will be described later, on the image data (RGB data) obtained by the scanner 114. A compression processing unit 116 compresses the image data represented as RGB color components, to each of which 8 bits are allocated, and output to the general-purpose bus. The compressed image data is transmitted to the controller unit 117 via the general-purpose bus. The controller unit 117 includes a semiconductor memory (not shown) to store image data fed from the compression processing unit 116. In this example, the image data is compressed; however, when a bandwidth of the general-purpose bus is sufficiently wide and the capacity of an HDD 118 is sufficiently large, the process of compressing the image data can be omitted.

Figure 5:
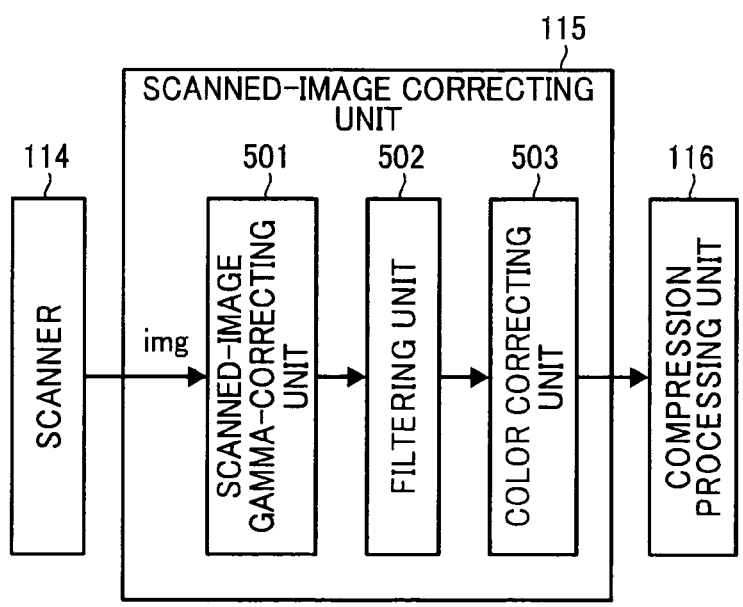
FIG. 5 depicts a configuration of a scanned-image correcting unit of an inspection apparatus.

The scanned-image correcting unit 115 will be described below. As illustrated in FIG. 5, the scanned-image correcting unit 115 performs image processing based on the image data img (of linear reflectance) fed from the scanner 114. A scanned-image gamma-correcting unit 501 converts the image data of linear reflectance into image data of linear image density. A filtering unit 502 performs sharpness enhancement on the image data to compensate for variation in modulation transfer function (MTF) of different scanners to thereby compensate for variations in scanners, and smoothing dot pattern in a halftone image.

A color correcting unit 503 converts the RGB data into standard data, or specifically brightness and color-difference signals, to facilitate image inspection.

Figure 6:
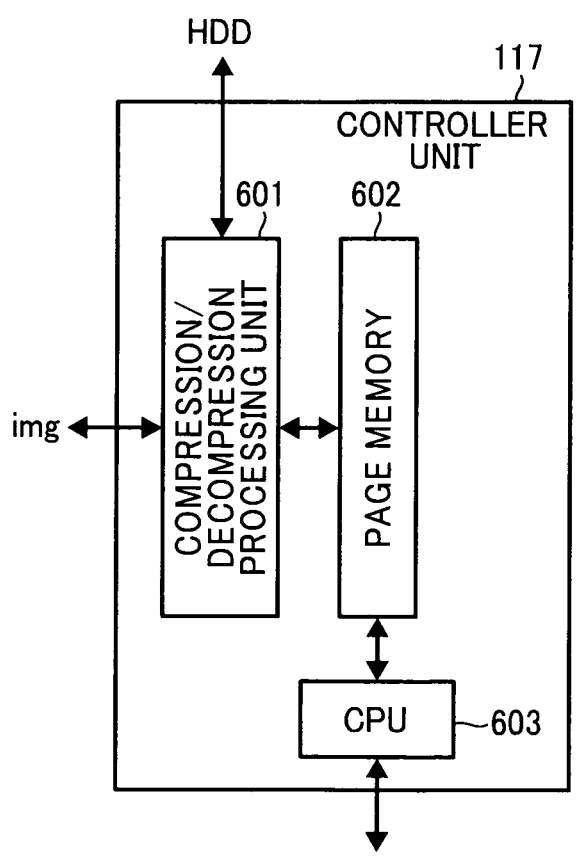
FIG. 6 depicts the configuration of a controller unit of the inspection apparatus.

As illustrated in FIG. 6, the controller unit 117 includes a compression/decompression processing unit 601, a page memory 602, and a CPU 603. A procedure for outputting image data to an external device is described below. Compressed image data is fed from the HDD or via the general-purpose bus to the compression/decompression processing unit 601. A decompression processing unit in the compression/decompression processing unit 601 decompresses the image data into image data represented as brightness and color-difference signals, renders the image data into bitmap, and writes the bitmap data which is to be subjected to image data inspection to the page memory 602. The HDD 118 stores image data obtained by scan by the inspection apparatus 102, image data obtained by the printer, and metadata, such as inspection coordinates and results of inspection. The image data obtained by the printer is also stored in the form of brightness and color-difference signals as in the case of the image data obtained by the inspection apparatus.

The inspection apparatus 102 receives the coordinates that are necessary for image inspection from the controller unit 107 of the printer 101, and performs image inspection based on the coordinates. If a result of the image inspection indicates that image density deviates from a median (target value), the inspection apparatus 102 sends a notification of this deviation to the controller unit 107 of the printer 101. Upon receiving the notification, the controller unit 107 of the printer causes the printing-image correcting unit 111 to perform density correction and the like. If the image density falls below a predetermined threshold value defined for print quality, the inspection apparatus 102 determines that the image is unacceptable, and, for instance, sorts out and outputs the unacceptable printed medium separately.

Figure 7:
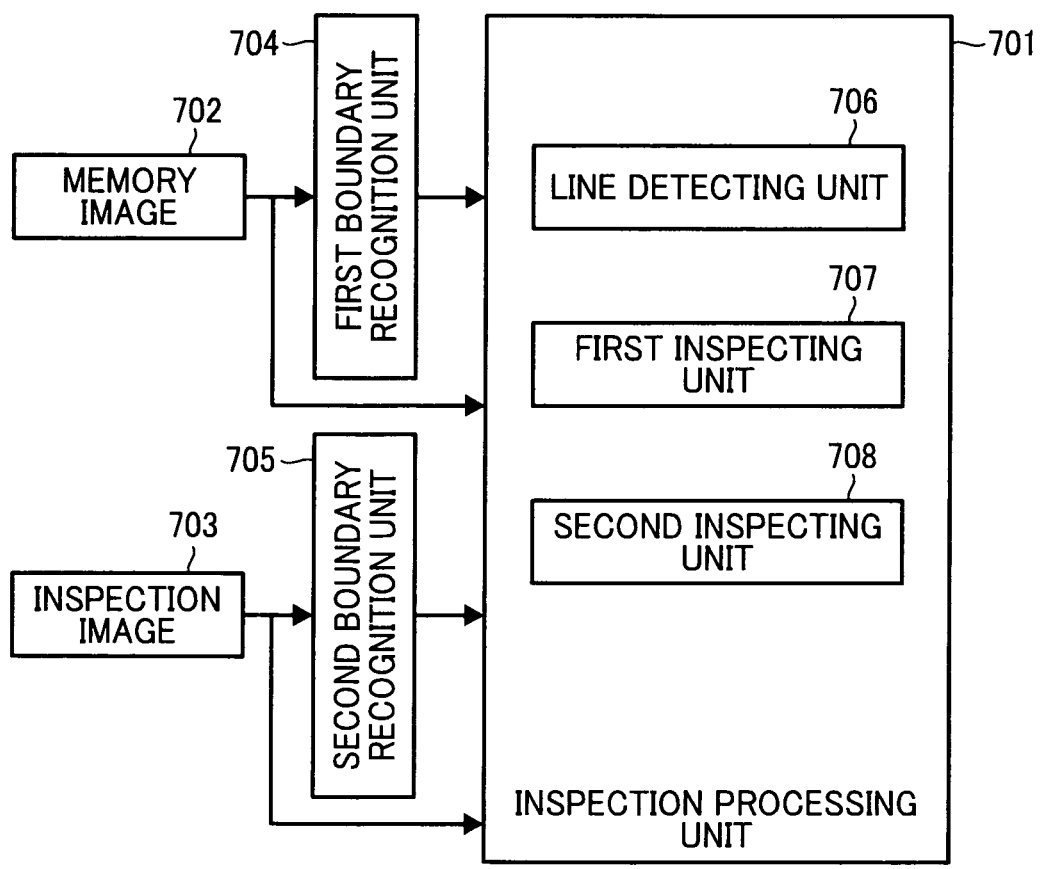
FIG. 7 depicts a configuration of an inspection unit according to the present embodiment.

FIG. 7 illustrates the configuration of an inspection unit in the controller unit 117 in the inspection apparatus 102 according to the present embodiment. The inspection unit includes an inspection processing unit 701, a first boundary recognition unit 704, and a second boundary recognition unit 705. The inspection processing unit 701 includes a line detecting unit 706, a first inspecting unit 707, and a second inspecting unit 708.

Images to be input to the inspection unit is an image stored in the memory (hereinafter, "memory image") 702 and an inspection subject image (hereinafter, "inspection image") 703. The memory image 702 is a digital image of image data to be printed to produce a printout, based on which the inspection image is produced. The inspection image 703 is an image obtained by scanning the printed medium 113, which is the printout produced by the printer 101, with the scanner 114 of the inspection apparatus 102 and to be subjected to inspection performed by the inspection apparatus 102. This image data to be subjected to inspection contains a position deviation amount (X) that has occurred during scan performed by the scanner 114.

In the present embodiment, inspection is performed based on luminance data (8-bit data configured such that 0 and 255 represent black and while, respectively). In the present embodiment, first boundary recognition, second boundary recognition, and inspection processes (line detection, first inspection, and second inspection) are performed by using the memory image 702 and the inspection image 703. Processing performed by the first boundary recognition unit 704 is the same as processing performed by the second boundary recognition unit 705 except for that input data to the first boundary recognition unit 704 is the memory image 702, whereas input data to the second boundary recognition unit 705 is the inspection image 703.

FIG. 8 is a diagram illustrating processing performed by the first boundary recognition unit 704 and the second boundary recognition unit 705. FIG. 8 represents a cross-sectional view of line images printed on paper. The line images are depicted such that the higher in the vertical direction, the more blackened the line image is (i.e., the image density increases). In FIG. 8, "a" illustrates an example of a thick line, whereas "b" illustrates an example of a thin line. Although FIG. 8 illustrates only one-dimensional structure to show a cross-sectional view, actual line images are two-dimensional images.

The second boundary recognition unit 705 is described below. A part of the inspection image 703 is illustrated in (A) of FIG. 8. A result of applying a maximum-value filter to the image data (A) is illustrated in (B) of FIG. 8. The maximum-value filter is a method that replaces a target pixel (center pixel) in an N×N matrix with a maximum-value pixel in the matrix. Note that N denotes a width that is twice as wide as X, which is the width of misalignment that has occurred when the image has been scanned by the scanner 114. The maximum-value filter reduces a high-density area in the image data (A) (i.e., a low-density area having large pixel values increases).

An output from a minimum-value filter at input of the image data (A) is illustrated in (C) of FIG. 8. The minimum-value filter is a method that replaces a target pixel (center pixel) in an N×N matrix with a minimum-value pixel in the matrix. The minimum-value filter reduces a low-density area in the image data (A) (i.e., a high-density area having small pixel values increases).

A result of subtraction of (C) from (B) is illustrated in (D) of FIG. 8. Thus, a boundary area (edge) in the image inclusive of the position deviation amount (X) can be extracted by using the maximum-value filter and the minimum-value filter.

The first boundary recognition unit 704 performs, on the memory image 702 (position deviation amount X=0), similar filtering as that performed on the inspection image 703.

The first inspecting unit 707 is described below. The first inspecting unit 707 determines whether the inspection image 703 is acceptable based on the difference between the memory image 702 and the inspection image 703 in the image area ("a" in (E) of FIG. 8) exclusive of the boundary (edge) in the image. The first inspecting unit 707 performs this determination by using a known technique, such as the technique disclosed in Japanese Patent Application Laid-open No. 2003-266646 described above.

More specifically, the first inspecting unit 707 determines whether the inspection image 703 falls between a result of addition of the result of applying the maximum-value filter to the memory image 702 and a bias, and a result of subtraction of a bias from the result of applying the minimum-value filter to the memory image 702. Furthermore, the first inspecting unit 707 determines whether the memory image 702 falls between a result of addition of the result of applying the maximum-value filter to the inspection image 703 and a bias, and a result of subtraction of a bias from the result of applying the minimum-value filter to the inspection image 703. Thus, the first inspecting unit 707 determines that the inspection image 703 is acceptable. Whether a portion that corresponds to a black portion in the memory image 702 has changed to white in the inspection image 703 is determined by comparing the output of the maximum-value filter at input of the memory image 702 with the inspection image 703. Whether a portion that corresponds to a white portion in the memory image 702 has changed to black in the inspection image 703 is determined by comparing the output of the minimum-value filter at input of the memory image 702 with the inspection image 703. Whether a portion that corresponds to a black portion in the inspection image 703 is white in the memory image 702 is determined by comparing the result of applying the maximum-value filter to the inspection image 703 with the memory image 702.

Because the first inspecting unit 707 that uses the maximum-value filter and the minimum-value filter can make erroneous determination at a boundary (edge) of an image due to the positional deviation, the first inspecting unit 707 does not inspect the boundary (edge) of the image.

Processing performed by the line detecting unit 706 is described below. The line detecting unit 706 performs detection based on an output of the first boundary recognition unit 704 at input of the memory image 702, and an output of the second boundary recognition unit 705 at input of the inspection image 703. Because processing performed by the first boundary recognition unit 704 is the same as that performed by the second boundary recognition unit 705, description only on the memory image 702 will be given below.

To the output of the first boundary recognition unit 704 at input of the memory image 702, the maximum-value filter and then to the minimum-value filter is applied. A result of applying the minimum-value filter to (A) of FIG. 8 after applying the maximum-value filter is illustrated in (E) of FIG. 8. If the line image is of a thick line as in the case of "a", an image that is akin to the original image data can be reproduced; however, if the line image is of a thin line as in the case of "b," reproducing of the image data fails, causing the thin line to be lost. Put another way, when subtraction of (E) from (A) is performed, the image data representing the thick line "a" is lost but only the image data representing the thin line "b" remains. A line image is extracted by utilizing this subtraction.

An output of a minimum-value filter at input of the result of subtraction of (E) from (A) is illustrated in (F) of FIG. 8. By binarizing the output (F), the image data (area exclusive of an area corresponding to the position deviation amount X) and a peripheral image (the area corresponding to the position deviation amount X) are extracted as illustrated in "b" of (F) of FIG. 8. The thus-extracted image data is line-image data inclusive of the edge, which cannot be inspected by the first inspecting unit 707.

The second inspecting unit 708 integrates (adds) image data pertaining to a predetermined area (corresponding to the width of the image indicated by "b" in (F) of FIG. 8) of each of the memory image 702 and the inspection image 703, and compares the integrations with each other. If, as a result of the comparison, the difference between the integrations falls in a predetermined range, the second inspecting unit 708 determines that the inspection image is acceptable. If a plurality of integrations are obtained for each of the memory image 702 and the inspection image 703, the second inspecting unit 708 determines that the inspection image 703 is acceptable when all the integrations fall in the predetermined range. If both the first inspecting unit 707 and the second inspecting unit 708 determine that, as a result of inspections, the inspection image is acceptable, the printed medium is determined as being acceptable. Whereas if any one of the results indicates that the inspection image is unacceptable, the printed medium is determined as being unacceptable. If a printed medium is determined as being unacceptable, for instance, image-processing parameters for printing can be changed (e.g., image density is changed); the unacceptable printed medium determined can be sorted out and output separately in other cases.

In the embodiment described above, inspection of a line image, in which color density is low in a peripheral portion while color density is high in a narrow area, is performed by subjecting the line image to the maximum-value filter and thereafter to the minimum-value filter. In contrast, inspection of a line image (outline character against a colored background), in which color density is high in a peripheral portion while color density is low in a narrow area, can be performed by subjecting the line image to the minimum-value filter and thereafter to the maximum-value filter. Alternatively, similar functions with those achieved by using the maximum-value filter and the minimum-value filter can be implemented by subjecting binary to a dilation and an erosion in place of the maximum-value filter and the minimum-value filter. Specifically, this is obtained by replacing the maximum-value filter and the minimum-value filter with a dilation filter and an erosion filter, respectively. Still alternatively, configuring the first inspecting unit with the maximum-value filter and the minimum-value filter and similarly configuring the line detecting unit with the maximum-value filter and the minimum-value filter allow processing to be shared. By configuring the first inspecting unit with a dilation filter and an erosion filter and configuring the line detecting unit with the maximum-value filter and the minimum-value filter, processing can be shared similarly.

The present invention can also be achieved by providing a storage medium, on which software program codes implementing the functions of the embodiment described above is stored, in a system or an apparatus and causing a computer (CPU or micro processing unit (MPU)) in the system or the apparatus to read and execute the program codes stored in the storage medium. In this case, the program codes read out from the storage medium implement the functions of the embodiment described above. Examples of the storage medium for use in supplying the program codes to the computer include an HDD, an optical disk, a magneto-optical disk, non-volatile memory card, and read only memory (ROM). The scope of the present invention encompasses not only a case where the functions of the embodiment are implemented through the execution of the program codes read out by the computer but also a case where, according to instructions of the program codes, a part or the entirety of actual processing is performed by an operating system (OS) or the like running in the computer, thereby implementing the functions of embodiment. Furthermore, the scope of the present invention also encompasses a case where the program codes read out from the storage medium are written to a memory provided in a function extension board inserted in the computer or provided in a function extension unit connected to the computer, and thereafter a part of or the entirety of actual processing is performed by a CPU or the like in the function extension board or the function extension unit according to instruction of the program codes, thereby implementing the functions of the embodiment. The program codes for implementing the functions of the embodiment can be provided from a server by communications with the server via a network.

According to an aspect of the present invention, inspection of a line image can be performed highly accurately. This allows determination as to whether a printed medium is acceptable.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image inspection apparatus configured to perform comparison between a reference image and an inspection image obtained by performing a scan of a printed medium on which the reference image has been printed, to determine whether the printed medium is acceptable, the image inspection apparatus comprising:
    a first inspecting unit configured to compare the reference image exclusive of an edge in the reference image with the inspection image exclusive of an edge in the inspection image to perform inspection;
    a line-image detecting unit configured to detect a line image inclusive of the edge in the reference image from the reference image, and a line image inclusive of the edge in the inspection image from the inspection image;
    a second inspecting unit configured to compare the line image inclusive of the edge in the reference image detected from the reference image with the line image inclusive of the edge in the inspection image detected from the inspection image to perform inspection; and
    a determining unit configured to determine whether the printed medium is acceptable based on a result of the inspection performed by the first inspecting unit and a result of the inspection performed by the second inspecting unit.

2. The image inspection apparatus according to claim 1, wherein the edge in the line image inclusive of the edge in the inspection image contains an area corresponding to a position deviation amount that occurs during the scan.

3. The image inspection apparatus according to claim 1, wherein the image inspection apparatus is configured such that image processing parameters for printing are changed when the determining unit determines the printed medium is unacceptable.

4. The image inspection apparatus according to claim 1, wherein the image inspection apparatus is configured such that the printed medium is sorted out when the determining unit determines the printed medium is unacceptable.

5. An image inspection method that performs comparison between a reference image and an inspection image obtained by performing a scan of a printed medium on which the reference image has been printed, to determine whether the printed medium is acceptable, the image inspection method comprising:
    performing a first inspection by comparing the reference image exclusive of an edge in the reference image with the inspection image exclusive of an edge in the inspection image to perform inspection;
    detecting a line image inclusive of the edge in the reference image from the reference image, and a line image inclusive of the edge in the inspection image from the inspection image;
    performing a second inspection by comparing the line image inclusive of the edge in the reference image detected from the reference image with the line image inclusive of the edge in the inspection image detected from the inspection image to perform inspection; and determining whether the printed medium is acceptable based on a result of the first inspection and a result of the second inspection.

6. A computer program product including a non-transitory computer readable storage medium containing instructions that, when executed by a computer, cause the computer to perform an image inspection method that performs comparison between a reference image and an inspection image obtained by performing a scan of a printed medium on which the reference image has been printed, to determine whether the printed medium is acceptable, the image inspection method comprising:

performing a first inspection by comparing the reference image exclusive of an edge in the reference image with the inspection image exclusive of an edge in the inspection image to perform inspection;

detecting a line image inclusive of the edge in the reference image from the reference image, and a line image inclusive of the edge in the inspection image from the inspection image;

performing a second inspection by comparing the line image inclusive of the edge in the reference image detected from the reference image with the line image inclusive of the edge in the inspection image detected from the inspection image to perform inspection; and determining whether the printed medium is acceptable based on a result of the first inspection and a result of the second inspection.

7. The image inspection apparatus according to claim 1, further comprising:

a first boundary unit and a second boundary unit which apply a maximum-value filter and a minimum-value filter to the reference image and the inspection image respectively.

8. The image inspection apparatus according to claim 7, wherein the maximum-value filter replaces a target pixel in a matrix with a maximum-value pixel in the matrix.

9. The image inspection apparatus according to claim 7, wherein the minimum-value filter replaces a target pixel in a matrix with a minimum-value pixel in the matrix.

* * * * *